(12) United States Patent
Matter et al.

(10) Patent No.: US 12,418,036 B2
(45) Date of Patent: Sep. 16, 2025

(54) OXYGEN-FED FUEL CELL SYSTEM AND METHOD OF USING SAME

(71) Applicant: pH Matter, Columbus, OH (US)

(72) Inventors: Paul H Matter, Columbus, OH (US); Minette C Ocampo, Columbus, OH (US); Travis M Hery, Hilliard, OH (US); Christopher T Holt, Bexley, OH (US)

( * ) Notice: Subject to any disclaimer, the term of this patent is extended or adjusted under 35 U.S.C. 154(b) by 0 days.

(21) Appl. No.: 17/727,138

(22) Filed: Apr. 22, 2022

(65) Prior Publication Data

US 2025/0023067 A1 Jan. 16, 2025

Related U.S. Application Data

(60) Provisional application No. 63/194,413, filed on May 28, 2021.

(51) Int. Cl.
*H01M 8/04089* (2016.01)
*H01M 8/04029* (2016.01)
(Continued)

(52) U.S. Cl.
CPC ... *H01M 8/04097* (2013.01); *H01M 8/04029* (2013.01); *H01M 8/0441* (2013.01);
(Continued)

(58) Field of Classification Search
CPC ......... H01M 8/04097; H01M 8/04029; H01M 8/0441; H01M 8/04455; H01M 8/04843;
(Continued)

(56) References Cited

U.S. PATENT DOCUMENTS

2002/0164511 A1* 11/2002 Uozumi ............ H01M 8/04029
429/429
2004/0126640 A1* 7/2004 Sanderson ........ H01M 8/04097
429/415
(Continued)

FOREIGN PATENT DOCUMENTS

CN 203907723 U * 10/2014

OTHER PUBLICATIONS

Machine translation CN203907723u (Year: 2014).*

*Primary Examiner* — Victoria H Lynch
(74) *Attorney, Agent, or Firm* — Michael Gallagher; Meredith Lloyd

(57) ABSTRACT

A fuel cell system includes hydrogen and oxygen storage vessels, a fuel cell stack, an air feed, an oxygen feed creating an internal oxygen pressure, at least one cathode and at least one cathode exhaust. The system can alternate between the air feed and/or the oxygen feed to the cathode of the fuel cell with air operation at lower power draw conditions and oxygen operation at higher power draw conditions. Oxygen may be recirculated from the cathode exhaust at a rate higher than stoichiometric and internal oxygen pressure may rise to above 1.1 bar. An automated control system can recirculate oxygen after air is expelled from the fuel cell stack, and there may be a recirculation of cathode exhaust, particularly a recirculation of oxygen exhaust. The fuel cell may be configured having ports with removeable connections for refilling the hydrogen storage vessel and the oxygen storage vessel.

19 Claims, 4 Drawing Sheets

(51) Int. Cl.
*H01M 8/0438* (2016.01)
*H01M 8/0444* (2016.01)
*H01M 8/04828* (2016.01)
*H01M 8/04858* (2016.01)
*H01M 8/22* (2006.01)

(52) U.S. Cl.
CPC ... *H01M 8/04455* (2013.01); *H01M 8/04843* (2013.01); *H01M 8/04932* (2013.01); *H01M 8/22* (2013.01); *H01M 2250/10* (2013.01); *H01M 2250/20* (2013.01)

(58) Field of Classification Search
CPC ............... H01M 8/04932; H01M 8/22; H01M 2250/10; H01M 2250/20
See application file for complete search history.

(56) References Cited

U.S. PATENT DOCUMENTS

| 2005/0008904 | A1* | 1/2005 | Suppes | H01M 8/0494 |
| | | | | 429/61 |
| 2005/0221148 | A1* | 10/2005 | Goebel | H01M 8/04231 |
| | | | | 429/429 |
| 2008/0160363 | A1* | 7/2008 | Tsukada | H01M 8/04141 |
| | | | | 429/513 |
| 2017/0096205 | A1* | 4/2017 | Mermelstein | B63G 8/001 |

* cited by examiner

OXYGEN-FED FUEL CELL SYSTEM AND METHOD OF USING SAME

CROSS-REFERENCE TO RELATED APPLICATIONS

This application claims the benefit of U.S. Provisional Patent Applications 63/181,994; filed Apr. 30, 2021; and U.S. Provisional Patent Application 63/194,413; filed May 28, 2021.

STATEMENT REGARDING FEDERALLY SPONSORED RESEARCH OR DEVELOPMENT

This invention was made with government support under Department of Energy Contract Number DE SC0017144. The government may have certain rights in the invention.

TECHNICAL FIELD

The present disclosure relates generally to a fuel cell system, particularly an oxygen-fed fuel cell system.

BACKGROUND OF THE INVENTION

A fuel cell is an electrochemical device that converts energy from hydrogen and oxygen into water and electricity. Fuel cells are particularly useful because large amounts of energy can be stored in the form of hydrogen. Storing more energy simply requires a larger hydrogen tank, which is a relatively low cost means of energy storage compared to other forms of energy storage, such as batteries. The oxygen required for the electrochemical reaction is readily available from air. Since the only product is water, if hydrogen is produced from a renewable source, such as water electrolysis, then hydrogen fuel cells can be a zero-emission form of power. Consequently, fuel cells can be useful for numerous applications, including stationary energy storage and transportation.

Those skilled in the art will appreciate that a major limitation of fuel cells is their power density. Power density directly impacts the cost and size of fuel cell systems. The power of a fuel cell is typically limited by the cathode, where oxygen is converted into water. Oxygen must be transported from air channels to the cathode catalyst layers. As higher and higher current is drawn from the cells, the air becomes nitrogen-enriched, water-enriched, and oxygen-depleted, until a "mass transport limiting current" or "maximum power" is ultimately reached. Limited power density necessitates using larger and more expensive fuel cell stacks to provide sufficient power. In many cases, the fuel cell system may be hybridized with a battery to provide for peak power. The drawback is that a hybrid approach adds to system cost and complexity in many cases.

To improve upon the mass transport limiting current, there are several approaches fuel cell developers have explored. Fuel cells can be designed to have better mass transport, including mixtures of hydrophobic and hydrophilic pores. The structure of the fuel cell can be optimized to facilitate improved mass transport. However, even with these approaches, oxygen transport still limits the maximum current density. At a system level, the flow rate of air can be increased to improve mass transfer. In some cases, the air is compressed to improve oxygen partial pressure and mass transfer during peak power operation. The limitations of these approaches are that additional components and parasitic losses occur. Even with high flow rates of compressed air, fuel cell current density will still be limited by oxygen transport.

Those skilled in the art will appreciate that fuel cells could operate with pure oxygen, instead of air. The first fuel cells developed for aerospace applications used pure oxygen [Fuel Cell Handbook—available at: https://www.osti.gov/servlets/purl/769283]. Pure oxygen is known to increase the voltage of a fuel cell, and consequently, has the potential to increase power density. A major drawback of using pure oxygen is that oxygen must be sourced and stored onboard as well, significantly increasing the cost, weight, and size of the system. Onboard storage of oxygen consequently decreases power density versus supplying oxygen from air.

For some cases, inventors have envisioned systems that operate on both air, and in specific cases, on oxygen. In U.S. Pat. No. 4,657,829, a system is disclosed where an onboard electrolyzer produces hydrogen and oxygen to power a fuel cell system while a hydrogen-generating reformer powers on. In patent application WO 2021/118660 A2, an aerospace system is disclosed where a fuel cell is powered predominantly by air, and in emergencies, when air is unavailable, the fuel cell is powered by oxygen that is generated from an integrated electrolyzer. However, this prior art does not disclose a method to rapidly increase the power density of the fuel cell system on demand. The dependence on an onboard electrolyzer to generate oxygen increases the complexity, weight, and size of the system, thus lowering system power density. Additionally, the prior art does not disclose a method to minimize expulsion of unused pure oxygen from the system. Allowing unused oxygen to escape from the cathode exit, as air-based fuel cells do, increases the need for onboard oxygen, thus further decreasing system power density.

SUMMARY OF THE INVENTION

The instant invention relates to a means of energy storage and power production. Energy storage is important for numerous applications, including storing renewable energy to match generation and demand fluctuations. Energy storage is also important for transportation. For transportation, energy must also be stored onboard vehicles and converted to power to match load requirements. Hydrogen fuel cells offer a zero-emission means to store energy and produce power when needed. However, in many cases, power production is a limiting factor with air-fed hydrogen fuel cell systems. The instant invention reveals a means to increase the power production of fuel cell systems using oxygen while maintaining high energy density.

A fuel cell system may include a hydrogen storage vessel in fluid communication with a hydrogen feed and an oxygen storage vessel also in fluid communication with an oxygen feed. There is a fuel cell, configured in a preferred embodiment as a fuel cell stack, in fluid communication with the hydrogen feed and the oxygen feed, and other features of the system may include an air feed, an oxygen feed creating an internal oxygen pressure, at least one cathode and at least one cathode exhaust.

There may be a means to alternate between the air feed and/or the oxygen feed to the cathode of the fuel cell and an automated control means that feeds oxygen to the fuel cell from the oxygen feed to create a predetermined power level in the fuel cell. As part of the above, in a preferred embodiment, there may be a means to recirculate oxygen from the cathode exhaust at a rate higher than stoichiometric, and a means to elevate the internal oxygen pressure to above 1.1 bar to at least as high as 30 bar. In another preferred embodiment, there may be an automated control system that recirculates oxygen after air is expelled from the fuel cell stack, and in particular this means may be controlled by a timer, electrochemical oxygen sensor, or other means as would be known by one skilled in the art.

In a preferred embodiment, there may be a recirculation of cathode exhaust, particularly a recirculation of oxygen exhaust. This may include a means to initiate an oxygen exhaust recirculation once air is at least 50% purged from the fuel cell by oxygen. The fuel cell system may be configured having ports with removeable connections for refilling the hydrogen storage vessel and the oxygen storage vessel. In some embodiments, the fuel cell system can be paired with a refueling system that has dual hydrogen and oxygen filling nozzles.

In another series of embodiments, there may be an automated control system for a fuel cell system that includes a fuel cell switchable between an air operation and an oxygen operation, with the air operation at lower power draw conditions and the oxygen operation at higher power draw conditions.

BRIEF DESCRIPTION OF THE ILLUSTRATIONS

Without limiting the scope of the fuel cell as disclosed herein and referring now to the drawings and figures.

Figure 1:
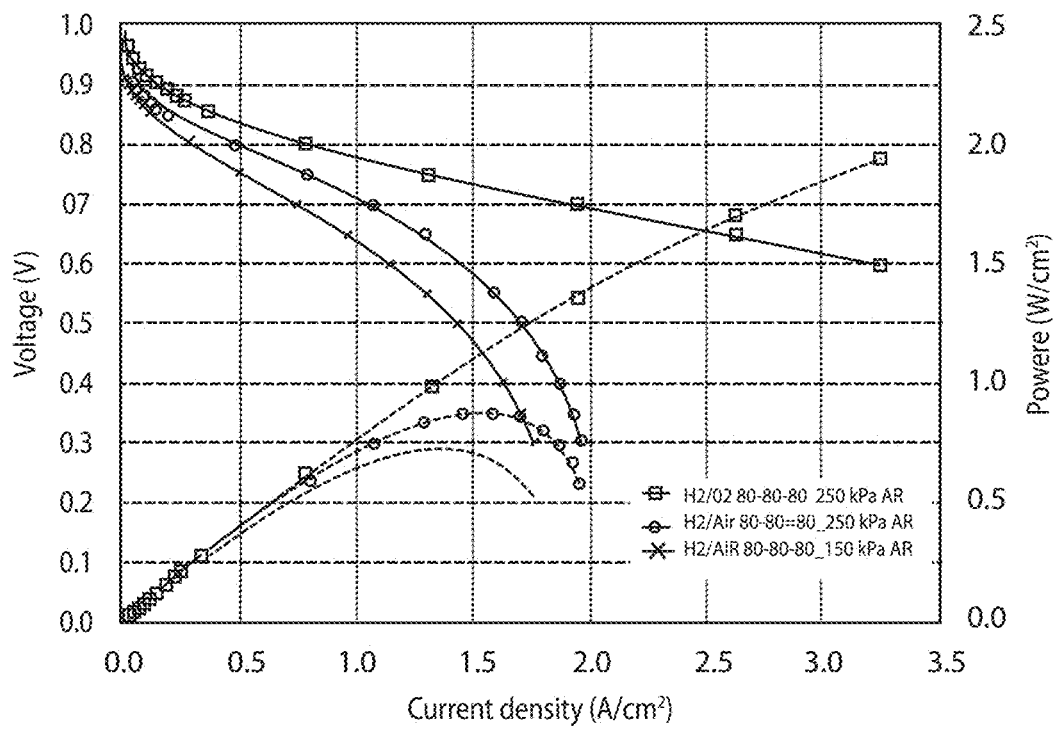
FIG. 1 shows current-potential and current-power curves for operation of a Proton Exchange membrane (PEM) fuel cell in air at 150 kPa and 250-kPa compared to operation of the same PEM fuel cell in pure oxygen at 250-kPa.

These illustrations are provided to assist in the understanding of the exemplary embodiments of a fuel cell system, and a method for using the same, as described in more detail below, and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The instant invention includes a fuel cell system that is powered by hydrogen in the anode, and air in the cathode for normal operation, or pressurized pure oxygen during periods of high power demand in the cathode. In a preferred embodiment, a valve or series of valves are activated by a control system when high power is required from the fuel cell. The valves switch the cathode gas feed from air to pure pressurized oxygen. A first valve may switch the incoming gas feed to oxygen. Once the oxygen has purged a majority of the air out of the fuel cell, a second valve initiates recycling and pressurization of the oxygen. For the purposes of this specification, "purged" shall have the meaning that at least 50% of the air in the fuel cell cathode has been replaced by oxygen. The activation of a first valve may be manually initiated by the system user. In a preferred embodiment, the valve activation may be initiated automatically by a fuel cell control system. The fuel cell control system could initiate the valve switching based on an increased demand for power, by measuring a lower voltage in the fuel cell stack caused by increased power demand, or by another signal as would be known to one skilled in the art. In a preferred embodiment, the activation of a second valve may be initiated from a timer based on a known purge time or may be initiated from a measurement of the fuel cell stack voltage at the known operating current, from an oxygen sensor, or from another means as would be known by one skilled in the art.

Those skilled in the art would appreciate that a fuel cell has higher voltage in oxygen compared to air at a similar current density. In a preferred embodiment, the activation of the first valve is executed within 5 seconds, and preferably within 50 milliseconds, of an increase in power demand, enabling a rapid response to the power demand increase. In a further preferred embodiment, expelled pure oxygen from the fuel cell stack is passed through a dehumidifier to remove excess water, then the oxygen is recycled using an oxygen-safe blower. In a preferred embodiment, the oxygen is pressurized to greater than 1.1 bar absolute pressure to increase the fuel cell performance. In some cases, the oxygen is pressurized to as much as 30 bar, or more, absolute pressure to increase the fuel cell performance. In another preferred embodiment, the incoming air may be filtered and purified to remove particles and contaminants that could potentially compromise the safe use of pure pressurized oxygen in the cathode.

In some embodiments, the control system may also include a capacitor. The capacitor could provide increased power for a short duration while air is being replaced with oxygen in the fuel cell cathode. In this case the system could respond more quickly to power demands. When power levels are being lowered, the capacitor could receive power from the fuel cell before the oxygen is fully purged with air and the fuel cell current is lowered. In this case the fuel cell would not experience higher voltage at low current. Those skilled in the art would appreciate that high voltages associated with pure oxygen at low current can degrade fuel cell cathodes more quickly.

In a preferred embodiment the fuel cell may be a Proton Exchange Membrane (PEM) fuel cell. The PEM fuel cell may be fed with hydrogen in a dead-end configuration. In a further preferred embodiment, the fuel cell may be a liquid cooled PEM fuel cell with internally manifolded oxidant flow paths. The liquid cooling has numerous advantages, including allowing the stack temperature to be maintained at low power levels or high-power levels without the inefficiency of using high stoichiometric flows of oxidant to provide cooling. Internally manifolded oxidant has numerous advantages, including allowing unused oxygen to be recycled back to the stack, instead of being expelled to the atmosphere.

In a preferred embodiment, the fuel cell stack is in fluid communication with stored hydrogen on the anode side, and either atmospheric air or stored oxygen on the cathode side, as seen well in FIGS. 1-4. The size of the hydrogen and oxygen storage may be sized appropriately for the intended use of the system. Specifically, the oxygen storage may be sized with sufficient oxygen volume such that pure oxygen can be used during the high-power duty cycles of the system, but less oxygen than a stoichiometric amount with respect to the hydrogen. For example, if a system operates at elevated power 50% of the time, and since 2 moles of hydrogen are consumed per mole of oxygen, then the maximum moles of oxygen storage would be 25% of the hydrogen storage. In another example, if a system operates at elevated power only 10% of the time, and since 2 moles of hydrogen are consumed per mole of oxygen, then the maximum moles of oxygen storage would be 5% of the hydrogen storage. Consequently, a relatively small oxygen tank could eliminate the need for a larger fuel cell or for complex, expensive, massive, and space-consuming hybridization with a battery, capacitor, turbine, and/or other high-power means of energy conversion. Those skilled in the art would also appreciate that if, in rare instances, all the oxygen is depleted from the oxygen storage, the system could be designed to continue operation at lower power levels with atmospheric air and hydrogen.

Figure 3:
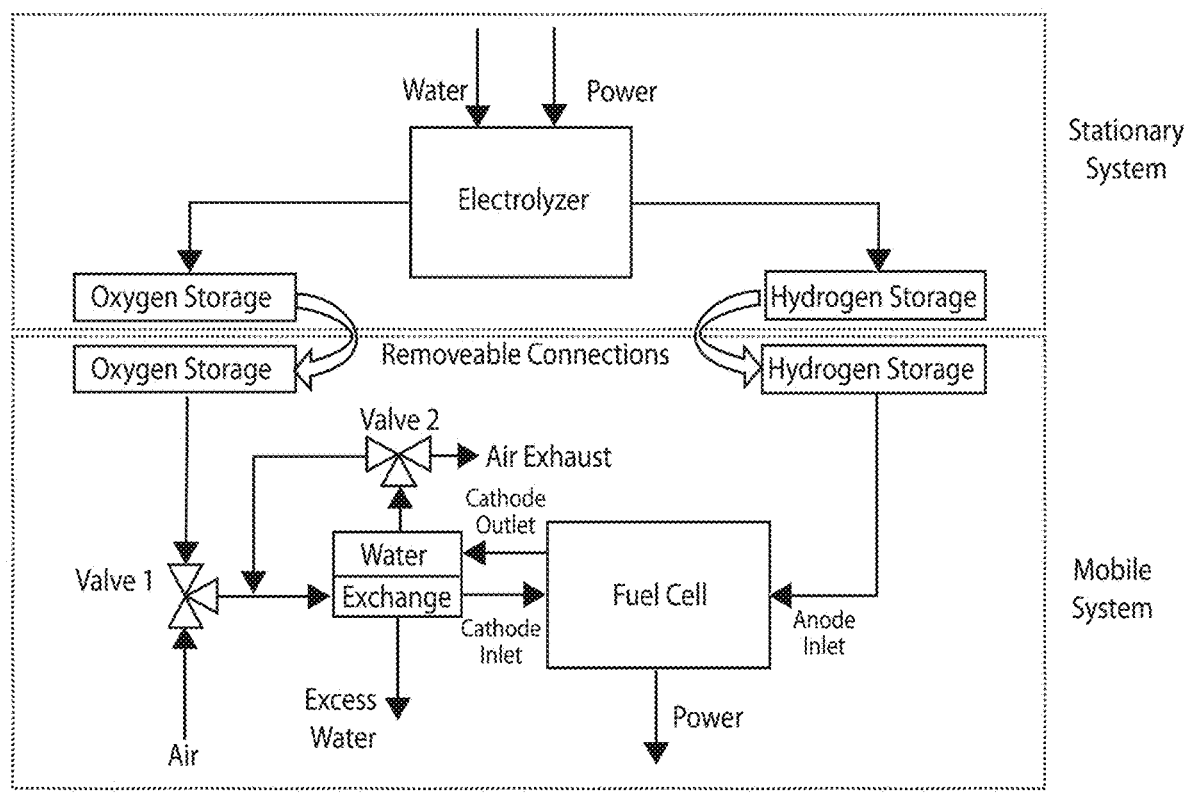
FIG. 3 shows a diagram of an embodiment of a fuel cell system design integrated with an electrolyzer with removable ports that enable the fuel cell system section to be mobile.

Further, the hydrogen and oxygen storage may be fitted with ports that allow the gases to be refueled quickly, as seen well in FIG. 3. In other instances, liquid hydrogen and/or liquid oxygen may be used. In still other instances, the hydrogen and oxygen storage may be connected to a water electrolyzer. In a preferred embodiment, the hydrogen and oxygen ports are fed from a dual hydrogen and oxygen filling station, wherein both hydrogen and oxygen can be refueled at the same time. In a further preferred embodiment, the hydrogen and oxygen ports are connected to hydrogen and oxygen nozzles on a single handle, allowing the user to easily refill both tanks simultaneously with ease. In another preferred configuration, the flow of oxygen may be restricted such that the refuel time may be similar to a larger volume of hydrogen being refueled simultaneously, thus minimizing the velocity of oxygen. In a preferred embodiment, the oxygen port and nozzle are covered when not in use to keep them clean and free of particles and debris.

EXAMPLES

Example 1. PEM Fuel Cell Operation

A 25-$cm^2$ fuel cell system was built comprising a sulfonated tetrafluoroethylene based fluoropolymer-copolymer (NAFION®, The Chemours Company FC, LLC; Delaware; U.S.A) 211 membrane, a 20-weight percent platinum/carbon anode catalyst, and 40 weight percent platinum/carbon cathode catalyst. First, the catalysts were mixed with NAFION® ionomer and water and alcohol solvent to form anode and cathode inks, respectively. The inks were painted on polytetrafluoroethylene (PTFE) (TEFLON®; The Chemours Company FC, LLC; Delaware; U.S.A) backing layers and transferred onto the membrane by hot pressing. The loading of platinum on the anode and cathode were 0.2 mg/$cm^2$ each. The fuel cell was loaded into a fuel cell technologies test station with 25-$cm^2$ manifolds.

The fuel cell was fed with pure hydrogen on the anode side and either air or oxygen on the cathode side. A three-way valve and mass flow controller were used to switch between cathode gas feeds. Back pressure regulators controlled the cell operating pressure. A humidifier was used to humidify incoming gas to near 100% relative humidity at 80° C. The manifold was heated to 80° C. The current-voltage characteristics of the fuel cell were measured in air at 150-kPa and 250-kPa, and in oxygen at 250-kPa, as shown in FIG. 1. As shown in the figure, significantly higher power and efficiency is obtained when operating the cell in pressurized oxygen.

Those skilled in the art would appreciate that even higher power could be achieved with thinner membranes. NAFION® 211 is 25-microns thick, but it is possible to produce membranes thinner than 8-microns. If a thinner membrane were used, the ohmic resistant would drop proportionally, allowing power density to exceed 5 watts per square centimeter.

Those skilled in the art would also appreciate that if the fuel cell and seals are properly designed, a PEM fuel cell could operate at pressures up to about 30 bar. At higher hydrogen and/or oxygen pressure, the Nernst potential of the fuel cell would increase dramatically at a given current. Further, oxygen reduction kinetics are known to improve with oxygen partial pressure. Finally, mass transfer would also improve at higher pressure. Consequently, higher pressure operation, possible with the instant invention, could dramatically increase fuel cell power density and efficiency.

Example 2 Stationary Back-Up Power System

Figure 2:
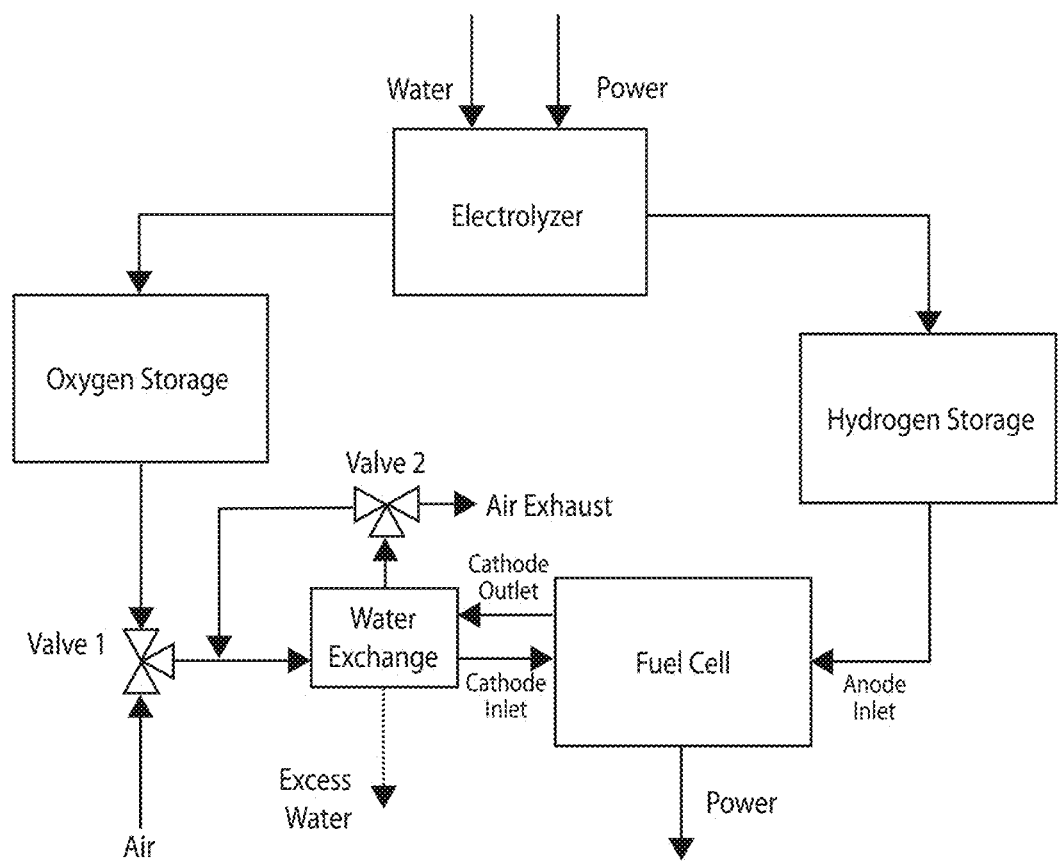
FIG. 2 shows a diagram of an embodiment of a back-up power fuel cell system.

In one embodiment of the invention, a fuel cell system with oxygen power-boosting may be used to provide back-up power. The system may use a PEM fuel cell stack made from a plurality of cells similar to Example 1. A preferred process flow diagram for the example is shown in FIG. 2. Valve 1 and Valve 2 are three-way valves. Valve 1 is positioned so that either pure oxygen or air is fed as oxidant to the fuel cell with a blower (not shown for simplicity). In normal operation air is used as oxidant for the fuel cell. Valve 1 is positioned for oxygen feed upon an increased power request, a low fuel cell voltage measurement, a high current measurement, and/or a low oxygen concentration sensor measurement. The oxidant passes through a water exchange subassembly that humidifies incoming gas and removes water from cathode outlet gas.

Excess water from exhausted oxidant may be removed within this subassembly. Humidified oxidant is fed to the cathode inlet of the fuel cell. Exhausted oxidant (pure oxygen, oxygen-depleted air, or mixtures thereof) passes from the cathode outlet to the water exchange subassembly, then to Valve 2. For air operation Valve 2 exhausts the oxygen-depleted air to the atmosphere. For oxygen operation, Valve 2 recycles the pure oxygen to the oxygen inlet side. To switch between air and oxygen operation, Valve 1 is positioned first to feed oxygen. Next, an oxygen sensor, the voltage of the stack, or a timing mechanism is monitored to determine when the fuel cell cathode has been purged of nitrogen. At that point, Valve 2 is positioned to recycle the unused oxygen, thus preventing the exhaust of large quantities of unused oxygen. If the oxygen storage becomes depleted, the valve switching is disabled, and the system operates only with air as the oxidant. A control system, which is not shown for simplicity, monitors the voltage of the stack, the current of the stack, and the oxygen concentration, while also controlling the position of the valves. In a further preferred embodiment, the fuel cell operates with pressurized oxygen. The increase in oxygen pressure increases the potential of the cells and improves performance. The fuel cell may also operate with pressurized hydrogen. The oxygen gas pressure is increased when both Valve 1 and Valve 2 are situated for closed loop oxygen operation, and the inlet oxygen pressure from the oxygen storage is increased.

In a preferred embodiment, the fuel cell stack may be liquid cooled to prevent the fuel cell from overheating. During periods of higher power demand, the rate of liquid coolant circulation through the fuel cell stack may be increased by the control system. The heat may be expelled from the liquid coolant using a heat exchanger, radiator, or other method known to those skilled in the art of temperature control.

In a further preferred embodiment, during elevated power operation, product water may be removed from the fuel cell stack via circulation of the oxygen through a device that removes excess water and/or cools the oxygen. Examples of such devices include, but are not limited to, a condenser, a membrane separator, or other forms of dehumidifier. Such an approach allows for dried oxygen to be returned to the fuel cell stack.

In a preferred embodiment, the hydrogen and oxygen are replenished with a water electrolyzer that feeds into the respective gas storge tanks. In this embodiment, the gas tanks are refilled when power is available, the fuel cell may be operated with oxygen when power is in high demand, and the fuel cell may be operated with air at lower power when oxygen is no longer available or low power may be required for a long time. In a preferred embodiment, the electrolyzer uses an anion exchange membrane (AEM) to keep oxygen and hydrogen separated. In a preferred embodiment, the electrolyzer operates at high pressure (10 to 1,000 bar), enabling the generation of hydrogen and oxygen gases that can be stored economically without further mechanical compression. Compression of water with a pump is not as energy intensive nor as inefficient as the compression of gases with a mechanical compressor. Therefore, such an embodiment would have significant advantages compared to conventional electrolysis systems that use compressors.

Typically, in some embodiments of the instant invention, an electrolyzer would operate to 30-bar or higher. In some cases, it may be advantageous to operate the hydrogen side of the electrolyzer at higher pressure than the oxygen. Hydrogen may be needed at high pressure for many applications, including hydrogen fuel cells for transportation. On a molar basis, only half the amount of oxygen is produced compared to hydrogen from water electrolysis, so oxygen storage tankage may be less expensive. In some cases, higher oxygen pressure may be a safety concern. In some cases, the system may not require large quantities of oxygen storage, as oxygen may be readily available from ambient air. In the described system, at least some of the energy is stored in both the form of oxygen and hydrogen.

One skilled in the art would appreciate that numerous methods exist to generate and hydrocarbon decomposition, to name a few. The hydrogen tank may be refilled from hydrogen generated by any method, not necessarily an electrolyzer. The hydrogen may come from a hydrogen pipeline and not necessarily a tank. Further, those skilled in the art would appreciate that pure oxygen may be generated from other methods, including pressure swing adsorption from air, membrane separation from air, fractional distillation of air, or other sources. The oxygen storage tank may be refilled from oxygen generated by any method.

Example 3 Mobile Power System

Figure 4:
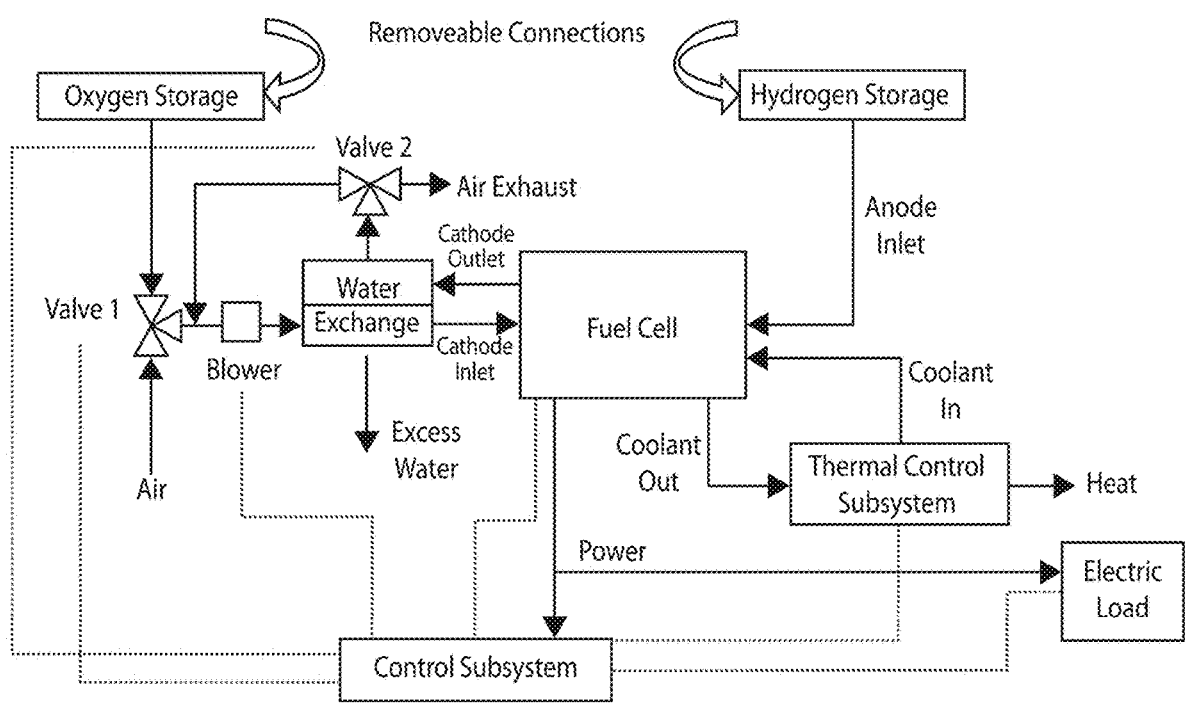
FIG. 4 shows a diagram of an embodiment of a fuel cell system including examples of some possible control communication lines.

In another preferred embodiment of the invention, a fuel cell system with oxygen power-boosting may be used to provide mobile power. A preferred process flow diagram for the example is shown in FIGS. 3 and 4. This particular system embodiment operates similarly to Example 2. However, in the example, the hydrogen and oxygen storage comprise two parts. One set of tanks are connected to a water electrolyzer that refills the tanks when power is available. A second set of tanks are located on a mobile vehicle. The tanks located on the vehicle may be refilled from time-to-time using a removeable connector attached to the electrolyzer tanks. In this approach, the electrolysis system is effectively a dual hydrogen and oxygen filling station for a fuel cell vehicle. In another embodiment, the electrolyzer may be located apart from the vehicle filling station, such that gas may be transported from an electrolyzer to a filling station, and then transferred from the filling station to a vehicle.

In one embodiment, the oxygen may be generated by separation of oxygen from air using any number of available approaches known to those skilled in the art, including pressure swing adsorption or membrane separation. In a preferred embodiment, an air separator may be part of a stationary unit that produces oxygen for an oxygen filling station. In another preferred embodiment, an air separator may be located onboard the vehicle. The air separator could be powered onboard the vehicle by regenerative breaking or auxiliary power when the vehicle is in use. Alternatively, the air separator could be powered through an electrical connection, such as a common outlet, when the vehicle is idle.

In a preferred embodiment, the fuel cell stack may be liquid cooled to prevent the fuel cell from overheating. During periods of higher power demand, the rate of liquid coolant circulation through the fuel cell stack may be increased by the control system. The heat may be expelled from the liquid coolant using a heat exchanger, radiator, or other method known to those skilled in the art of temperature control.

In an embodiment, the control system may also include a capacitor. The capacitor could provide increased power for a short duration while air is being replaced with oxygen in the fuel cell cathode. In this case the system could respond more quickly to power demands. When power levels are being lowered, the capacitor could receive power from the fuel cell before the oxygen is fully purged with air and the fuel cell current is lowered. In this case the fuel cell would not experience higher voltage at low current. Those skilled in the art would appreciate that high voltages associated with pure oxygen at low current can degrade fuel cell cathodes more quickly.

In a further preferred embodiment, during elevated power operation, product water may be removed from the fuel cell stack via circulation of the oxygen through a device that removes excess water and/or cools the oxygen. Examples of such devices include, part are not limited to, a condenser, a membrane separator, or other forms of dehumidifier. Such an approach allows for dried oxygen to be returned to the fuel cell stack.

One skilled in the art would appreciate that numerous methods exist to generate and hydrocarbon decomposition, to name a few. The mobile hydrogen tank may be refilled from hydrogen generated by any method. That hydrogen may come from a hydrogen pipeline and not necessarily a tank. Further, those skilled in the art would appreciate that pure oxygen may be generated from other methods, including pressure swing adsorption from air, membrane separation from air, and fractional distillation of air. The mobile oxygen tank may be refilled from oxygen generated by any method.

Example 4 Dual Refueling Nozzle

In another preferred embodiment, a mobile fuel cell system may be refueled at a dual hydrogen and oxygen filling station. The filling station may include a system that simultaneously refills the hydrogen and oxygen tanks on the vehicle. In a preferred embodiment, the vehicle storage tanks may be refueled using a set of nozzles in which the gas flow rate through both nozzles are controlled by the same system. In a further preferred embodiment, both nozzles may be located on the same handle for convenience of the user, and thus refueling ports on the vehicle are designed to mate with the dual nozzle Example 5 Delivery Truck In a preferred embodiment, the fuel cell system described in Example 3 may be located on a truck. The advantage of this embodiment may be that the truck can haul payloads with zero-emissions. The fuel cell operates in oxygen mode during time periods of acceleration. The fuel cell operates in air mode when the truck is not accelerating. The instant invention minimizes the size of the fuel cell and eliminates the need for heavy and expensive batteries to simultaneously achieve zero emissions and power requirements. Refueling connections may be conveniently located at the home base of the truck fleet or along frequently travelled corridors.

Example 6 Vertical Take-Off and Landing

In another preferred embodiment, the fuel cell system described in Example 3 may be located on a zero-emission vertical take-off and landing aerial vehicle. An advantage of this embodiment may be that the vehicle can carry heavier payloads with zero-emissions. The fuel cell may operate in oxygen mode during time periods of ascent, acceleration, and/or maneuvers. The fuel cell may operate in air mode when the vehicle is descending or traveling at an average speed. The instant invention minimizes the size of the fuel cell and eliminates the need for heavy and expensive batteries to simultaneously achieve zero emissions and power requirements. Refueling connections may be conveniently located at the home base of the vehicle or along frequently travelled corridors.

Example 7 High Power Fuel Cell Systems

Numerous other embodiments would benefit from the high power fuel cell system described in the examples above. Those skilled in the art would appreciate that the technology could be useful for such applications as marine vessels, cargo ships, passenger ships, trains, rail cars, mining equipment, construction equipment, fleet vehicles, material handling equipment, portable electronics equipment, stationary equipment and such other applications as would be known by one skilled in the art. One skilled in the art will also envision systems that incorporate a mixture or combination of the elements described in the examples above.

What is claimed then, is a fuel cell system that includes a hydrogen storage vessel in fluid communication with a hydrogen feed and an oxygen storage vessel also in fluid communication with an oxygen feed. There is a fuel cell, configured in a preferred embodiment as a fuel cell stack, in fluid communication with the hydrogen feed and the oxygen feed. Other features of the system may include an air feed, an oxygen feed creating an internal oxygen pressure, at least one cathode and at least one cathode exhaust.

There may be a means to alternate between the air feed and/or the oxygen feed to the cathode of the fuel cell and an automated control means that feeds oxygen to the fuel cell from the oxygen feed to create a predetermined power level in the fuel cell. A cooling system means may be present, having liquid coolant to remove waste heat from the fuel cell or fuel cell stack.

As part of the above, in a preferred embodiment, there may be a means to recirculate oxygen from the cathode exhaust at a rate higher than stoichiometric, and a means to elevate the internal oxygen pressure to above 1.1 bar.

In another preferred embodiment, there may be an automated control system that recirculates oxygen after air is expelled from the fuel cell stack, and in particular this means may be controlled by a timer.

In yet another embodiment, there may be a means to dehumidify an oxygen exhaust from the cathode exhaust before recirculating the oxygen exhaust to the fuel cell, and an oxygen sensor to detect when air is purged from the fuel cell stack.

In a preferred embodiment, there may be a recirculation of cathode exhaust, particularly a recirculation of oxygen exhaust. This may include a means to initiate an oxygen exhaust recirculation once air is at least 50% purged from the fuel cell by oxygen. The cooling system may also have a variable speed pump that recirculates the liquid coolant at an increased rate during an elevated power mode operation.

In two particular embodiments, which may be coextensive, a fuel cell may generate greater than 1 Watt per square centimeter when operated in an elevated power mode; and/or a fuel cell that doubles its maximum power when operated in an oxygen mode compared to an air mode.

A fuel cell may be configured having ports with removeable connections for refilling the hydrogen storage vessel and the oxygen storage vessel, and the nozzle associated with the ports may be fixed to a single handle.

In another series of embodiments, there may be an automated control system for a fuel cell system that includes a fuel cell switchable between an air operation and an oxygen operation, with the air operation at lower power draw conditions and the oxygen operation at higher power draw conditions. The terms "lower" and "higher," applied to power draw, are not susceptible to exact parameters, as would be known to one skilled in the art and would be established in a particular case by the capacity of the fuel cell and the needs of a user. The oxygen operation utilizes substantially pure pressurized oxygen. For the purposes of this specification, "pure" oxygen is defined as oxygen being at least 50% pure $O_2$, preferably at least 90% pure $O_2$, and most preferably at least 95% pure $O_2$. This may allow the fuel cell to operate on the pure pressurized oxygen at a current density above about 500 mW/cm$^2$ in one embodiment, and at a current density above about 1,000 mW/cm$^2$ in another, and in yet another, to operate on pure pressurized oxygen at a current density above about 2,000 mW/cm$^2$. In still other series of embodiments, a current density of 5,000 mW/cm$^2$ or even higher may be achieved.

Various means to control switching from an air operation to an oxygen operation would be understood by those skilled in the art and could include an event such as an increased power request to the control system, a predetermined fuel cell voltage measurement, a predetermined oxygen sensor measurement, a predetermined electrical current measurement, and other means and events. Such events could control, by way of example only and not limitation, a mixing valve, switchable between oxygen and air inputs.

In yet another series of embodiment, there may be a fuel cell system that includes a hydrogen storage vessel and an oxygen storage vessel, as well as a fuel cell in fluid communication with the hydrogen storage vessel and the oxygen storage vessel, at least one cathode, and a cathode exhaust.

There may be a means to alternate between an air feed and an oxygen feed to the cathode of the fuel cell, thereby allowing oxygen to at least partially purge air from the fuel cell. Such alternation of gas may be at least in part controlled by an automated control scheme that feeds oxygen to the fuel cell when elevated power levels are needed.

Additionally, the system may include a cooling means to remove waste heat from the fuel cell with liquid coolant, and filling ports, with removeable connections for refilling the hydrogen storage vessel and the oxygen storage vessel. There may also be a means to initiate an oxygen exhaust recirculation once air is at least 50% purged from the fuel cell by oxygen.

Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations. Accordingly, even though only few variations of the products and methods are described herein, it is to be understood that the practice of such additional modifications and variations and the equivalents thereof, are within the spirit and scope of the method and products as defined in the following claims. The corresponding structures, materials, acts, and equivalents of all means or step plus function elements in the claims below are intended to include any structure, material, or acts for performing the functions in combination with other claimed elements as specifically claimed.

What is claimed is:

1. A fuel cell system comprising:
   a. a hydrogen storage vessel in fluid communication with a hydrogen feed,
   b. an oxygen storage vessel in fluid communication with an oxygen feed,
   c. a fuel cell stack in fluid communication with the hydrogen feed and the oxygen feed, an air feed, an oxygen feed creating an internal oxygen pressure, at least one cathode and at least one cathode exhaust, wherein the internal oxygen pressure is above 1.1 bar,
   d. wherein the fuel cell stack comprises one or more proton exchange membranes, and a means to alternate between the air feed and/or the oxygen feed to the cathode of the fuel cell,
   e. an automated control means that feeds oxygen to the fuel cell from the oxygen feed to create a predetermined power level in the fuel cell, wherein the automated control means feeds oxygen to the fuel cell via one or more control valves,
   f. an automated control system that dehydrates a cathode exhaust stream, discharges an air exhaust from the cathode exhaust stream, and recirculates the cathode exhaust stream to the fuel cell stack via a water exchange subassembly after air is purged from the fuel cell stack, and
   g. a cooling system means having liquid coolant to remove waste heat from the fuel cell.

2. The system of claim 1, further comprising a means to recirculate oxygen from the cathode exhaust at a rate higher than stoichiometric.

3. The system of claim 1, further comprising a means to elevate the internal oxygen pressure at the cathode of the fuel cell stack to above 1.1 bar.

4. The system of claim 1, further comprising an automated control system that supplements the dehydrated cathode exhaust stream with pure oxygen from the oxygen storage vessel.

5. The system of claim 1, further comprising an oxygen sensor to detect when air is purged from the fuel cell stack.

6. The system of claim 1, further comprising a means to initiate an oxygen exhaust recirculation once air is at least 50% purged from the fuel cell by oxygen.

7. The system of claim 1, wherein the cooling system further comprises a variable speed pump that recirculates the liquid coolant at an increased rate during an elevated power mode operation.

8. The system of claim 1, further comprising a fuel cell that generates greater than 1 Watt per square centimeter when operated in an elevated power mode.

9. The system of claim 1, further comprising a fuel cell that increases its maximum power by a factor of at least 2.5 when operated in an oxygen mode compared to an air mode.

10. The system of claim 1, further comprising ports having removeable connections for refilling the hydrogen storage vessel and the oxygen storage vessel.

11. The system of claim 10, wherein the ports with removeable connections for refilling the hydrogen storage vessel and the oxygen storage vessel are fixed to a single handle.

12. An automated control system for a fuel cell system, switchable between an air operation and an oxygen operation, wherein the automated control system switches the fuel cell between air operation at lower power draw conditions and oxygen operation at higher power draw conditions, wherein the oxygen operation dehydrates a cathode exhaust stream, discharges an air exhaust from the cathode exhaust stream, and recirculates the dehydrated cathode exhaust stream to the fuel cell via a water exchange subassembly.

13. The system according to claim 12 wherein the oxygen operation utilizes pure pressurized oxygen.

14. The system of claim 13 where the fuel cell operates on the pure pressurized oxygen at a current density above about 500 $mW/cm^2$.

15. The system of claim 13 where the fuel cell operates on the pure pressurized oxygen at a current density above about 1,000 $mW/cm^2$.

16. The system of claim 13 where the fuel cell operates on the pure pressurized oxygen at a current density above about 2,000 $mW/cm^2$.

17. The system of claim 12 where the automated control system switches from the air operation to the oxygen operation based on an event selected from the group of events consisting of an increased power request to the control system, a predetermined fuel cell voltage measurement, a predetermined oxygen sensor measurement, and a predetermined electrical current measurement.

18. A fuel cell system comprising:
   a. a hydrogen storage vessel,
   b. an oxygen storage vessel,
   c. a fuel cell in fluid communication with the hydrogen storage vessel and the oxygen storage vessel, at least one cathode, and a cathode exhaust, wherein the fuel cell operates at a pressure above 1.1 bar, and wherein a cathode exhaust stream is dehydrated, an air exhaust is discharged from the cathode exhaust stream, and recirculated to the fuel cell via a water exchange subassembly, d. a means to alternate between an air feed and an oxygen feed to the cathode of the fuel cell, thereby allowing oxygen to at least partially purge air from the fuel cell, wherein the means to alternate between an air feed and an oxygen feed is a series of valves, e. an automated control scheme that feeds oxygen to the fuel cell when elevated power levels are needed, f. a cooling means to remove waste heat from the fuel cell with liquid coolant, and g. ports with removeable connections for refilling the hydrogen storage vessel and the oxygen storage vessel.

19. The system of claim 18, further comprising a means to initiate an oxygen exhaust recirculation once air is purged from the fuel cell by oxygen.

\* \* \* \* \*